US008544010B2

(12) United States Patent
Huang et al.

(10) Patent No.: US 8,544,010 B2
(45) Date of Patent: Sep. 24, 2013

(54) PROVIDING NOTIFICATION TO SPECULATIVELY WAKING UP TARGET VIRTUAL MACHINE FOR AN I/O EVENT USING MULTIPLE VIRTUAL MACHINES AND PROCESSORS

(75) Inventors: Wei Huang, Sunnyvale, CA (US);
Xiaoxin Chen, Cupertino, CA (US);
Michal Ostrowski, Austin, TX (US);
Qicheng Christopher Li, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 737 days.

(21) Appl. No.: 12/563,017

(22) Filed: Sep. 18, 2009

(65) Prior Publication Data

US 2011/0072426 A1    Mar. 24, 2011

(51) Int. Cl.
G06F 9/46 (2006.01)
G06F 9/455 (2006.01)
G06F 3/00 (2006.01)

(52) U.S. Cl.
USPC ............... 718/102; 718/103; 718/100; 718/1; 719/318; 719/319; 710/1; 710/5; 710/6

(58) Field of Classification Search
None
See application file for complete search history.

(56) References Cited

U.S. PATENT DOCUMENTS 6,430,592 B1 *  8/2002  Davison ................. 718/103
2005/0246453 A1 * 11/2005  Erlingsson et al. .......... 710/1

OTHER PUBLICATIONS

U. S. Appl. No. 11/857,964, filed Sep. 19, 2007, titled "Reducing the Latency of Virtual Interrupt Delivery in Virtual Machines.".

* cited by examiner

Primary Examiner — Meng An
Assistant Examiner — Bing Zhao

(57) ABSTRACT

A computer system having a plurality of processor cores utilizes a device driver running in a driver virtual machine to handle I/O with the corresponding device for other virtual machines. A hypervisor in the computer system receives an interrupt from the corresponding device and identifies a virtual machine that best correlates to the received interrupt prior to forwarding the interrupt for handling by the driver virtual machine. The hypervisor then speculatively transmits a notification to the identified virtual machine to wake up and poll a memory shared between the identified virtual machine and the driver virtual machine. Once the driver virtual machine completes handling of the forwarded interrupt, it copies data made available by the corresponding device to the shared memory for access by the polling identified virtual machine.

13 Claims, 6 Drawing Sheets

Correlation Matrix
Data Structure 500

| Interrupt Vector | User VM 1 | User VM 2 | User VM 3 | ... | User VM N |
|---|---|---|---|---|---|
| 1 | 0 | 18 | 0 | ... | 0 |
| 2 | 30 | 0 | 0 | ... | 0 |
| ... | | | | ... | |
| 64 | 0 | 0 | 20 | ... | 0 |
| ... | | | | ... | |

505

FIGURE 5

US 8,544,010 B2

PROVIDING NOTIFICATION TO SPECULATIVELY WAKING UP TARGET VIRTUAL MACHINE FOR AN I/O EVENT USING MULTIPLE VIRTUAL MACHINES AND PROCESSORS

BACKGROUND

Many virtualized computer systems run device drivers inside a virtual machine (referred to herein as a "driver VM") rather then inside the hypervisor for reasons of stability and safety. A driver VM utilizes pre-existing device drivers developed for the guest operating system of the driver VM thereby eliminating the necessity of writing device drivers specifically for the hypervisor. As such, hypervisor design is simplified, thereby potentially making the virtualized environment more stable. Furthermore, from a safety perspective, potential bugs in the device drivers will not compromise the hypervisor or other virtual machines (VMs) because the effect of the bugs will be contained within the driver VM. However, the use of driver VMs does result in performance loss. Specifically, to handle device I/O events for any particular VM (referred to herein as a "user VM"), the hypervisor must invoke the driver VM to handle the device I/O event and the driver VM, in turn, must ultimately notify the requesting user VM upon completion of the device I/O event (e.g., by trapping to the hypervisor to request an inter-VM notification to the user VM). Extra context switching overhead is incurred in invoking the driver VM and handling interrupts and inter-VM notifications to inform the user VM.

Running a driver VM based virtualized environment in a computer system with a multi-core processor has the potential to reduce performance losses caused by the driver VM. Multi-core processors provide multiple central processing units (CPUs) or cores on a single silicon chip. These CPUs operate concurrently and can read and write to any portion of a computer system's memory. Multi-core processors provide significant increases in performance when a computer system's workload is highly parallelized such that each core runs portions of the computer system's workload simultaneously. As such, running multiple virtual machines (VMs) on a multi-core processor architecture results in increased performance because each virtual machine can run simultaneously on separate processing cores.

In a computer system having a multi-core processor, a driver VM can run in parallel with another user VM for which it is currently handling device I/O if each of the VMs runs on a different core. However, due to time sharing and multitasking of processes (e.g., different VMs) on each CPU core, it is difficult to ensure that a particular user VM has timely possession of a CPU core to process I/O data that has been made available to it by a driver VM running on a different CPU core. This problem is further compounded by the amount of computing resources needed to transmit an inter-VM notification from a driver VM to a user VM through the hypervisor to notify the user VM that I/O data is available.

SUMMARY

In a virtualization system having a user virtual machine (VM) accessing a physical device by way of a virtual device driver and a driver VM, the user VM may, on a speculative basis, be woken up, i.e., sent a device interrupt or other notification, prior to the driver VM having made I/O data available to the user VM. One such method is performed in a first process, such as a hypervisor, running on a first CPU of a multiprocessor computer system in order to wake a second process, such as a user VM, to run on a second CPU of the multiprocessor computer system. According to such method, a notification is received by the first process from an I/O device indicating availability of data from the I/O device, the notification having an associated vector. The first process then identifies that the second process correlates to the vector by checking a data structure that maintains correlations between vectors for received notifications and existing processes supported by the multiprocessor computer system. After such identification, the first process transmits a wake-up message to the second process to wake up the second process to run on the second CPU and poll for the data, and then forwards the notification to be handled by a handler running on the first CPU. In one exemplary embodiment, the handler is a device driver corresponding to the I/O device that resides in a driver VM and the data is copied into a shared memory by a proxy process in the driver VM that interacts with the device driver.

BRIEF DESCRIPTION OF THE DRAWINGS

FIG. 5 depicts a correlation matrix data structure for identifying a VM for transmission of a speculative notice.

DETAILED DESCRIPTION

Figure 1:
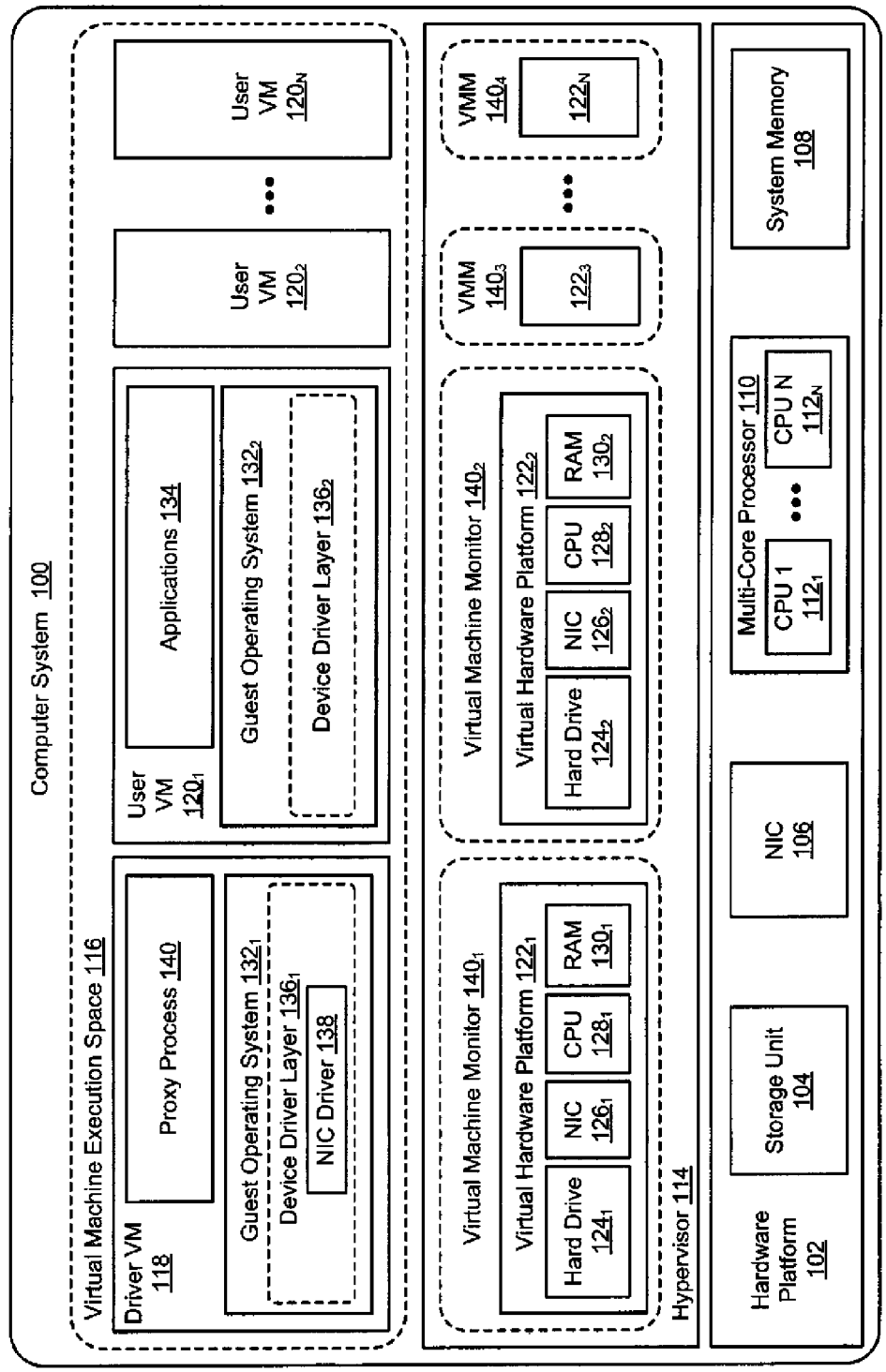
FIG. 1 depicts a block diagram of a driver VM-based virtualized computer system.

FIG. 1 depicts a block diagram of a driver VM-based virtualized computer system. Host computer system 100 may be constructed on a desktop, laptop or server grade hardware platform 102 such as an x86 architecture platform. Such a hardware platform may include a local storage unit 104, such as a hard drive, network adapter (NIC 106), system memory 108, multi-core processor 110 and other I/O devices such as, for example and without limitation, a mouse and keyboard (not shown in FIG. 1). Multi-core processor 110 provides multiple CPUs $112_1$ to $112_N$ which operate concurrently and can read and write to any portion of system memory 108.

A virtualization software layer, also referred to hereinafter as hypervisor 114, is installed on top of hardware platform 102. Hypervisor 114 supports virtual machine execution space 116 within which multiple VMs may be concurrently instantiated and executed. As shown, virtual execution space 116 includes a driver VM 118 and user VMs $120_1$-$120_N$. For each of driver VM 118 and user VMs $120_1$-$120_N$, hypervisor 114 manages a corresponding virtual hardware platform (i.e., virtual hardware platforms $122_1$-$122_N$) that includes emulated hardware such as virtual hard drive $124_2$, virtual NIC $126_2$, virtual CPU $128_2$ and guest physical RAM $130_2$ for user VM $120_1$. For example, virtual hardware platform $122_2$ may function as an equivalent of a standard x86 hardware architecture such that any x86 supported operating system, e.g., Microsoft Windows®, Linux®, Solaris® x86, NetWare, FreeBSD, etc., may be installed as guest operating system $132_2$ to execute any supported application in application layer 134 for user VM $120_1$. Device driver layer $136_2$ in guest operating system $132_2$ of user VM $120_1$ includes device drivers (e.g., pre-existing device drivers available for guest operating system $132_2$, etc.) that interact with emulated devices in virtual hardware platform $122_2$ as if such emulated devices were actual physical devices. Hypervisor 114 is responsible for transforming requests from device drivers in device driver layer $136_2$ that are received by emulated devices in virtual platform $122_2$, into corresponding requests that are transmitted by hypervisor 114 to and handled by a device driver in guest operating system $132_1$ of driver VM 118, such as NIC driver 138. In turn, NIC driver 138 interacts with its own emulated NIC $126_1$ in virtual hardware platform layer $122_1$ to correspond with the NIC 106 in hardware platform 102 in order to handle the request originating from user VM $120_1$. Generally, driver VM 118 interacts with NIC 106 via emulated NIC $126_1$ (e.g., which simply serves as a "pass-through" component forwarding communications directly between NIC driver 138 and NIC 106) on behalf of user VMs $120_1$ to $120_N$. Proxy process 140 of driver VM 118 runs on top of guest operating system $132_1$ and manages communications between driver VM 118 and user VMs $120_1$-$120_N$ and interacts with NIC driver 138 to transmit and receive network data on behalf of user VMs $120_1$-$120_N$.

It should be recognized that various implementation decisions may be made relating to the use of driver VMs as depicted in FIG. 1. For example, each different device driver required by computer system 100 can be executed in a separate and co-existing driver VM or, alternatively, a single driver VM may support all device drivers. Furthermore, it should further be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate from VMMs $140_1$-$140_N$, and VMMs $140_1$-$140_N$ may be considered to be separate from hypervisor 124. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2:
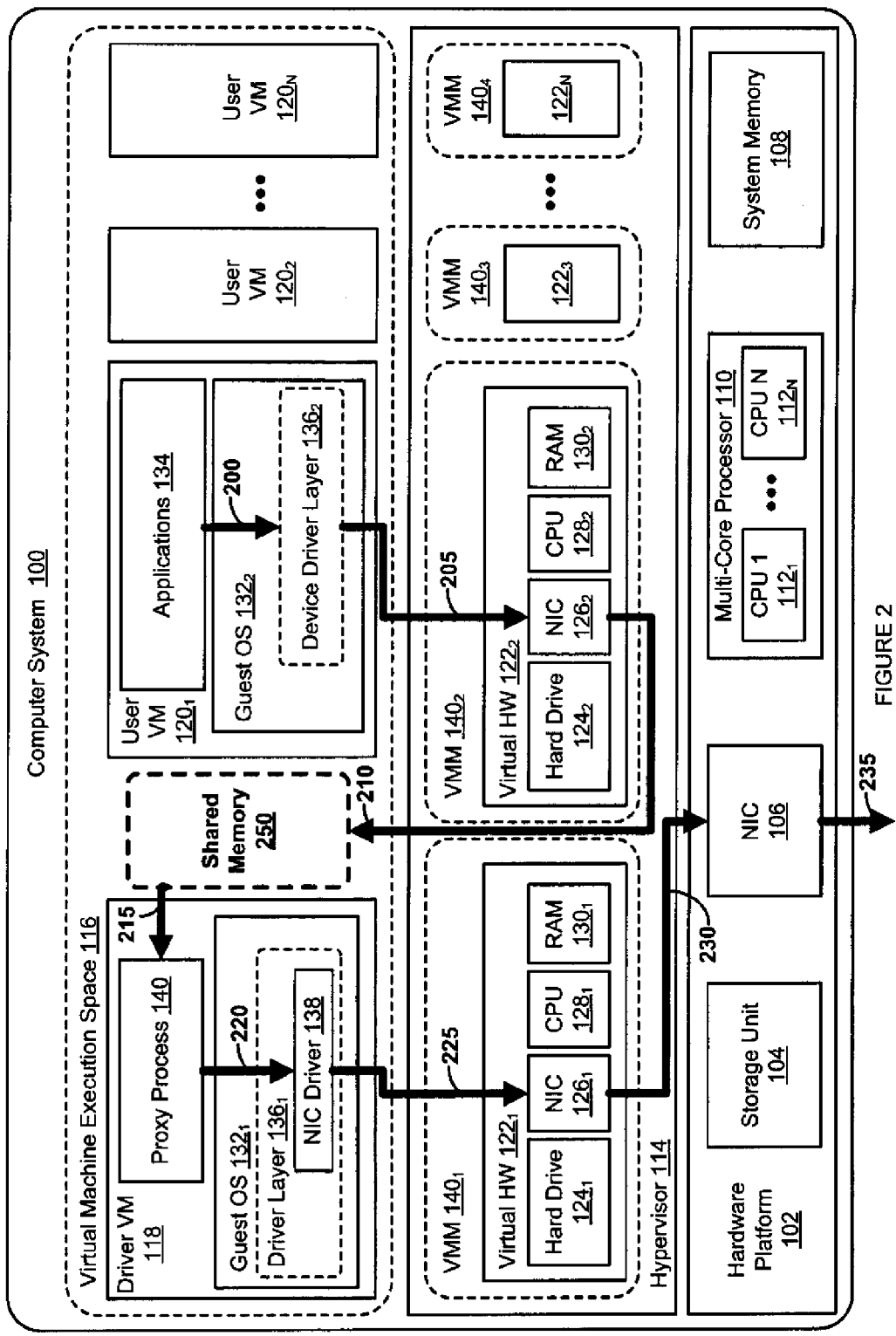
FIG. 2 depicts a flow of an I/O request from a user VM to a corresponding device through the use of a driver VM.

FIG. 2 depicts a flow of an I/O request from a user VM to a corresponding device through the use of a driver VM. In step 200, an application from application layer 134 requests the transmission of data onto the network by interacting with a NIC device driver in device driver layer $136_2$. The NIC device driver interacts with emulated NIC $126_2$ in step 205, requesting the transmission of data onto the network. Emulated NIC $126_2$ interacts with other supporting components in hypervisor 114 to allocate a shared memory space 250 between driver VM 118 and user VM $120_1$ (i.e., if such memory space has not already been previously allocated) and, in step 210, the data to be transmitted onto the network as requested by the application is written into shared memory space 250. In step 215, proxy process 140 learns of the presence of the data in shared memory space 250 (e.g., by polling, interrupts, and other similar inter-process notification techniques) and in step 220, interacts with NIC driver 138 to request transmission of the data stored in shared memory space 250 onto the network. In step 225, NIC driver 138 interacts with emulated NIC $126_1$, which functions as a "pass-through" component, forwarding the transmission request directly to hardware NIC 106, which in step 235 transmits the data onto the network.

Figure 3:
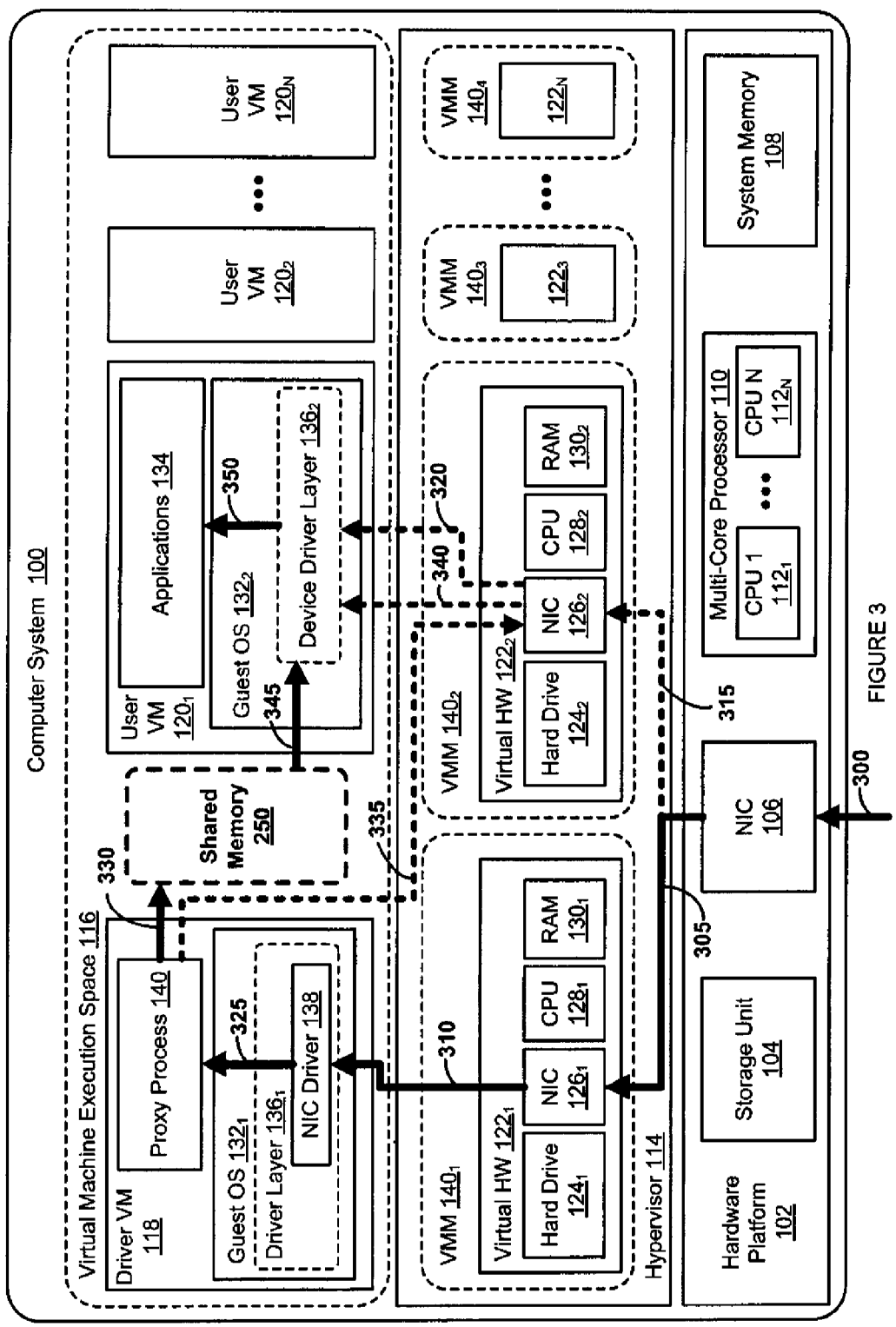
FIG. 3 depicts a flow of received data from a device to a user VM through the use of a driver VM.

FIG. 3 depicts a flow of received data from a device to a user VM through the use of a driver VM. In step 300, data arrives at hardware NIC 106. In one embodiment, for example, hardware NIC 106 receives the data and via direct memory access (DMA) stores the data in an area of system memory 108 that is accessible by NIC driver 138 of driver VM 118. In step 305, NIC 106 notifies emulated NIC $126_1$ (e.g., via interrupt or other similar notification techniques), which serves as a "pass-through" component, forwarding the notification to NIC driver 138, in step 310. NIC driver 138 is able to examine the data made available by hardware NIC 106 to determine which of user VMs $120_1$-$120_N$ the data corresponds to. In the example flow of FIG. 2, NIC driver 138 determines that the data corresponds to user VM $120_1$, and in step 325, NIC driver 138 notifies proxy process 140 which, in step 330, copies the data to shared memory 250, which is shared with user VM $120_1$. Through inter-VM notification or other similar notification processes, in step 335, proxy process 140 notifies NIC $126_2$ that data is available in shared memory 250 and NIC $126_2$, in step 340, notifies the NIC device driver in device driver layer $136_2$ of VM $120_1$ (e.g., via interrupt of other similar notification techniques) of the availability of the data. The NIC driver, in turn, provides such data to the awaiting application in applications 134 of VM $120_1$ in step 350.

As should be recognized, employing a device driver in driver VM 118 to handle I/O requests, in contrast to the alternative of employing a device driver in hypervisor 114 itself to handle such I/O requests, introduces the additional step of the inter-VM notification of step 335 to notify an awaiting user VM of incoming data. Whereas a device driver in hypervisor 114 would directly instruct an awaiting user VM's emulated device to transmit an interrupt to the awaiting user VM, a device driver in driver VM 118, in certain embodiments, may need to transmit an inter-VM notification (or other similar notification) through the hypervisor to notify the awaiting user VM of incoming data. Such an inter-VM notification can be computationally expensive because the driver VM has to first "trap" to the hypervisor (i.e., cede processor control to the hypervisor) which then transmits an interrupt or other similar wake-up notification to a different processing core upon which the awaiting user VM runs in order to complete the inter-VM notification.

Rather than waiting until the driver VM examines the data to identify the awaiting user VM to transmits an inter-VM notification to such user VM (as in step 335 of FIG. 3), hypervisor 114, upon receiving notice of the availability of data from NIC 106, may attempt to predict the identification of the awaiting user VM and transmit a wake-up notice (e.g., interrupt or other similar notification process) to such awaiting user VM prior to the driver VM's own determination of the identity of the awaiting user VM. Steps 315 and 320 of FIG. 3 illustrates an example flow of such wake-up notice. In such embodiments, upon notification of the availability of data from hardware NIC 106, hypervisor 114 speculatively identifies a user VM (e.g., user VM $120_1$) to which the available data belongs and instructs (e.g., step 315) the emulated NIC (e.g., NIC $126_2$) of such user VM to transmit an interrupt (e.g., step 32) to the user VM. Transmission of this "speculative notice" by hypervisor 114 may occur, for example, either immediately, or otherwise, before or after forwarding the interrupt from hardware NIC 106 in step 305 to the pass-through emulated NIC $126_1$ of driver VM 118. If hypervisor 114 has correctly identified the user VM corresponding to the available data, transmission of this speculative notice to the user VM eliminates the need for a subsequent more computationally expensive inter-VM notification from the driver VM (as in step 335 to wake up the user VM) thereby improving overall I/O performance for the computer system.

Figure 4:
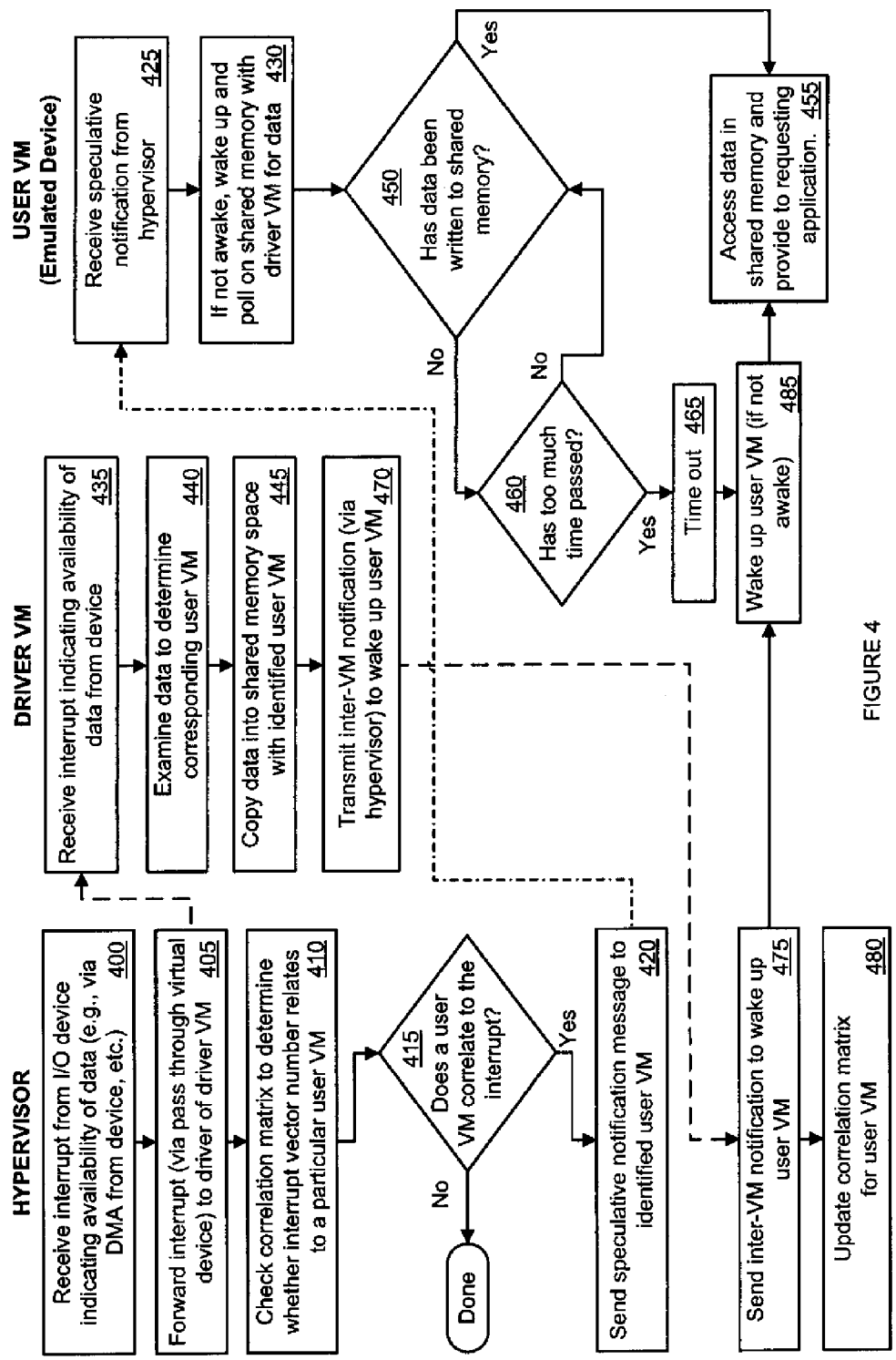
FIG. 4 depicts a flow chart for providing speculative notice to a VM of incoming data from a device.

FIG. 4 depicts a flow chart for providing speculative notice to a VM of incoming data from a device. Although the steps in FIG. 4 are described in conjunction with computer system components of FIG. 1, it should be recognized any alternative embodiment of a computer system consistent with the teachings herein may be utilized. For example, the following description of the flow chart utilizes the NIC driver VM of FIG. 1 for exemplary purposes and it should be recognized any device driver may utilize the steps disclosed herein. In step 400, hypervisor 114 receives an interrupt from an I/O device, such as hardware NIC 106, corresponding to a particular interrupt vector (e.g., or other unique index that corresponds to an interrupt handler for such I/O device) indicating the availability of data at the device. In certain embodiments, for example, the hardware NIC 106 may copy device data via DMA into a memory buffer in system memory 108 that is accessible by the NIC driver 138 of driver VM 118. The device data may be data generated or received by the device that is requested or received by programs running on computer system 100. In the case of NIC 106, the device data may be a data packet received over a network, however other devices may generate or receive different types of data. In step 405, hypervisor 114 forwards the interrupt to the NIC driver 138 in driver VM 118 (i.e., through a pass-through emulated NIC $126_1$ of the driver VM 118, as in steps 305 and 310 of FIG. 3). In step 410, hypervisor 114 examines its correlation matrix data structure (as further described below) to determine whether the interrupt vector relates to a particular user VM. If, in step 415, the correlation matrix data structure indicates that the interrupt vector corresponds to a particular user VM, then in step 420, the hypervisor 114 transmits a speculative notice to the identified user VM, in this example, user VM $120_1$. In one embodiment, the speculative notice is an instruction to the emulated I/O device (such as virtual NIC $126_2$) of the user VM (such as user VM $120_1$) indicating that an I/O event has arrived or that a previously requested I/O has been completed. In such an embodiment, for example, such a notice may cause the emulated I/O device to transmit an interrupt to the device driver in the guest operating system of the user VM or perform any other appropriate action in accordance with the user VM's specifications. However, it should be recognized that such speculative notice can be implemented by any other known techniques used by a hypervisor to wake up a user VM.

In step 425, the emulated device (e.g., virtual NIC $126_2$) of the user VM receives the speculative notice and in step 430, the user VM wakes up (e.g., it is given possession of one of the CPUs in multi-core processor 110) and virtual NIC $126_2$ begins to poll on memory buffer 250 which is shared between the user VM and the driver VM for the available data. In the meantime, in step 435, the driver VM 118 receives the interrupt forwarded by hypervisor 114 in step 405 and, in step 440, its NIC driver 138 examines the data (e.g., stored by the NIC 106 in a memory buffer accessible to the NIC driver 138 via DMA, etc.) to determine the user VM to which the data belongs. Once the user VM is determined by the device driver (e.g., user VM $120_1$ in this example), in step 445, proxy process 140 of driver VM 118 interacts with NIC driver 138 to copy the data into shared memory 250. Once the data is copied into shared memory 250, the virtual NIC $126_2$ of user VM $120_1$, which has been polling shared memory 250 since step 430 (using one of the CPU cores of multi-core processor 110 different from the CPU core used by driver VM 118 during steps 435 to 445), recognizes that the data has been written to shared memory 250 in step 450, and in step 455, the virtual NIC $126_2$ transmits an interrupt to the NIC device driver in the guest OS of user VM $120_1$ which in turn provides the data to the requesting application in applications layer 134.

However, if user VM $120_1$ polls for too long, such that in step 460, too much time has passed before driver VM 118 has had the opportunity to copy the data into shared memory 250 in step 445, then VM $120_1$ times out in step 465 and cedes its possession of the CPU core back to other processes (e.g., other user VMs, etc.). After step 445, proxy process 140 of driver VM 118, as a back-up action in the event the speculative notice of step 420 may be transmitted by hypervisor 114 too early (e.g., resulting in a time out as previously discussed) or is otherwise incorrect (e.g., has been transmitted to the wrong user VM, etc.), initiates an inter-VM notification in step 470 via hypervisor 114 to notify user VM $120_1$ that data in shared memory 250 is ready to be accessed. Hypervisor 114 receives the inter-VM notification in step 470 and transmits an interrupt or other similar notification in step 475 to user VM $120_1$ to wake up and access shared memory 250 for the data in step 480. Furthermore, as further discussed below, in step 485, hypervisor 114 also updates its correlation matrix data structure based on the information it receives from the inter-VM notification (e.g., the interrupt vector identified in the inter-VM notification related to user VM $120_1$, etc.). In certain embodiments, initiation of an inter-VM notification in step 470 resulting in an update in correlation matrix in step 480 is performed only intermittently in order to minimize the computational expense of traps to the hypervisor caused by inter-VM notifications. In such embodiments, for example, the driver VM may be able to recognize situations which would require transmission of an inter-VM notification to trigger update of the correlation matrix (e.g., driver VM can be configured and shared memory can be structured such that the driver VM recognizes when data that it has written into the shared memory is not being polled or otherwise consumed by a user VM, etc.).

In embodiments of a driver VM based computer system such as FIG. 1, hypervisor 114 does not support a device driver itself and therefore does not have the capability to examine incoming data from I/O devices to determine which user VMs such data relate to. Instead, hypervisor 114 may maintain and utilize a correlation matrix data structure (as referred to in step 410 of FIG. 4) to track the correlation of interrupt vectors to user VMs. FIG. 5 depicts a correlation matrix data structure for identifying a VM for transmission of a speculative notice. Each time hypervisor 114 receives a request to wake-up a user VM from driver VM 118 via inter-VM notification (e.g., from step 475 of FIG. 4), hypervisor 114 updates its correlation matrix data structure 500 by increasing a counter associated with the interrupt vector referred to in the driver VM's inter-VM notification request and the user VM to which the notification is to be transmitted. If, for example, driver VM 118 transmits an inter-VM notification request to hypervisor 114 to send an interrupt corresponding to interrupt vector 64 to user VM 3, then hypervisor 114 increments entry 505 in its correlation matrix data structure of FIG. 5 from 20 to 21.

When an interrupt for a specified interrupt vector for a device arrives, such as in step 400 of FIG. 4, then in step 410, hypervisor 114 checks correlation matrix data structure 500 by scanning the row corresponding to the specified interrupt vector. If hypervisor 114 can locate an entry in the row that has a value that meets a certain specified criteria (e.g., the value of the entry if greater than 90% of the sum of remaining entries in the row), then hypervisor 114 can speculate that the device correlated to the specified interrupt vector is being heavily used by the user VM corresponding to the located entry. In one embodiment, hypervisor 114 also compares the value in the located entry with other entries in the same column of the correlation matrix data structure 500. If such column comparisons also meet a specified criteria (e.g., the value of the entry is greater than 90% of the sum of remaining entries in the column or any other criteria consistent with the teachings herein, etc.), then hypervisor 114 can further speculate the user VM corresponding to the located entry is primarily using the device corresponding to the specified interrupt vector. In such instances, hypervisor 114 transmits a speculation notice to the user VM corresponding to the located entry as described in step 420 of FIG. 4. In certain embodiments, if hypervisor 114 cannot find such a value (i.e., that meets the comparison criterion for both the row and column comparisons), it does not transmit a speculation notice because it cannot strongly speculate a correlation between a particular interrupt vector and user VM. It should be recognized that other data structures and other comparison criterion may be used in alternative embodiments of a correlation matrix data structure. For example, in one alternative embodiment, hypervisor's 114 speculation may be made based on just a row comparison rather than both row and column comparisons.

Figure 6:
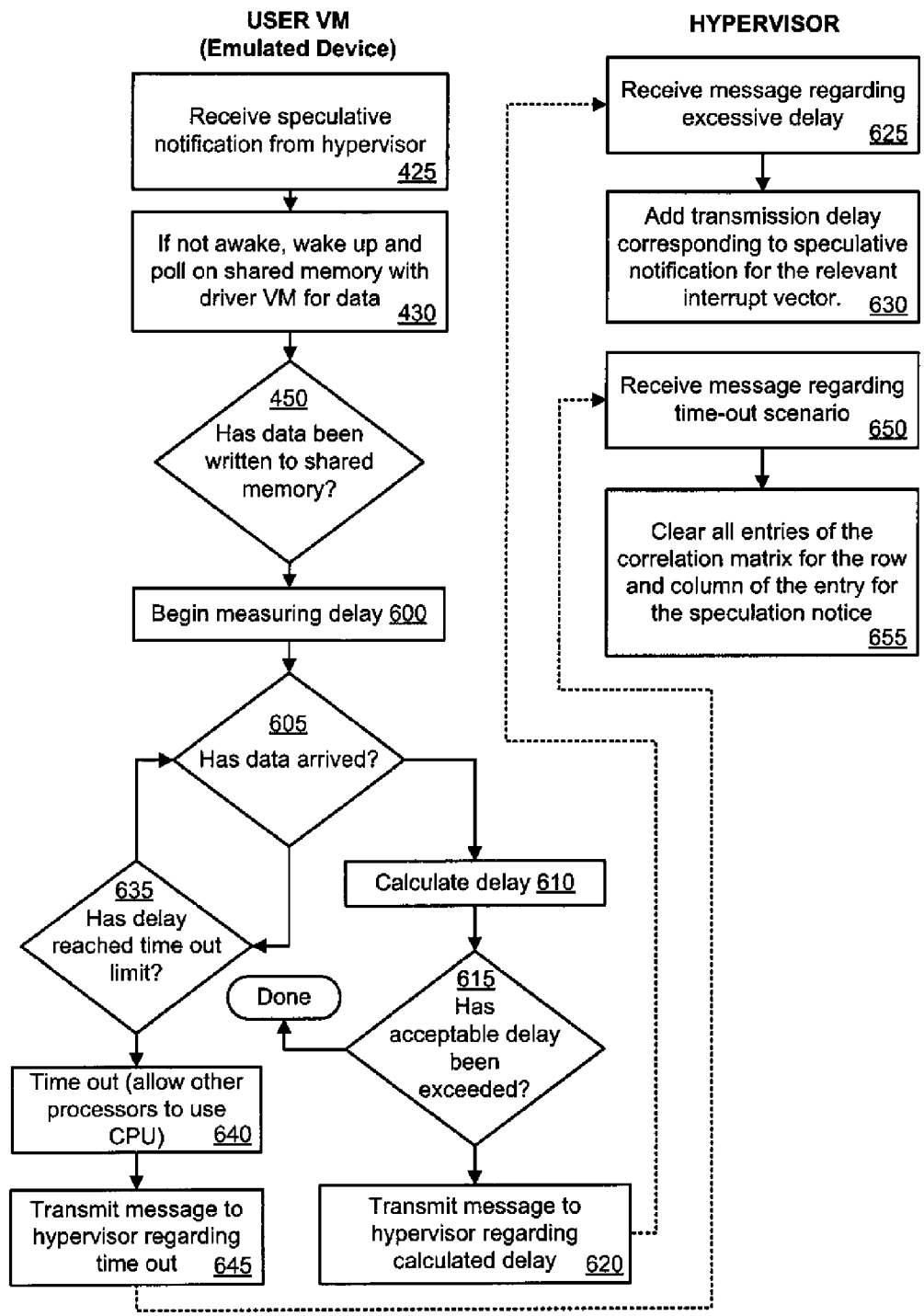
FIG. 6 depicts a flow chart for providing feedback from a user VM to a hypervisor to adjust the transmission of speculative notices.

Modifications in the emulated device layer of user VMs are contemplated for providing feedback to hypervisor 114 to improve performance of the speculative notice techniques described herein. FIG. 6 depicts a flow chart for providing feedback from a user VM to a hypervisor to adjust the transmission of speculative notices. As depicted in FIG. 6, if in step 450 (of FIG. 4) the emulated device, such as virtual NIC 126$_2$, upon polling shared memory 250, discovers that data from hardware device 106 has been written by driver VM 118 into shared memory 250 (via step 445 in FIG. 4), in step 600, virtual NIC 126$_2$ begins to measure the amount of delay before the data arrives. If in 605, the data arrives, then virtual NIC 126$_2$ calculates the amount of the delay in step 610, and if, in step 615, the amount of the delay exceeds a specified acceptable delay amount, virtual NIC 126$_2$ transmits a message to hypervisor 114 in step 620 to add a corresponding delay prior to transmitting the relevant speculative notice in step 420 of FIG. 4 (i.e., the speculative notices of step 420 are being transmitted too quickly, thereby waking up the user VM too soon and wasting CPU cycles while the user VM polls in step 430). In step 625, hypervisor 114 receives the message from virtual NIC 126$_2$ and, in step 630, stores the corresponding delay amount so that it will add such a delay prior to transmitting future speculation notices corresponding to the relevant interrupt vector in step 420 of FIG. 4. If, however, in step 605, data is not written to shared memory such that user VM times out while polling in steps 635 and 640, then in step 645, virtual NIC 126$_2$ transmits a message to hypervisor 114 regarding its time out (i.e., traffic patterns may have changes and the correlation matrix data structure is now inaccurate). In step 650, hypervisor 114 receives the message regarding the time out and in step 655, clears all the entries in the row and column corresponding to the correlation matrix entry used by speculation notice that caused the time out. Variations of the feedback process discussed in conjunction with FIG. 6 are contemplated. For example, in one alternate embodiment, feedback messages to the hypervisor, such as steps 620 and 645 can be performed on a periodic basis rather than every time. Similarly, an alternative embodiment may clear only the row entries of the correlation matrix rather than both the row and column entries as in step 655.

It should be recognized that various modifications and changes may be made to the specific embodiments described herein without departing from the broader spirit and scope of the invention as set forth in the appended claims. For example, although the foregoing embodiments have been described in the context of a driver VM 118 that supports a NIC driver 138, it should be recognized that any I/O device can be supported in a driver VM 118 consistent with the teachings herein. Similarly, it should be recognized that certain functions and actions described herein as being performed by certain components can be performed by alternate components in alternative embodiments. For example, while FIGS. 4 and 6 describe certain steps being performed by the emulated device layer of a user VM, it should be recognized that alternative embodiments may perform such steps within other components of the hypervisor or within the device driver in the guest operating system of the user VM. Similarly, it should be recognized that alternative embodiments may perform steps allocated to the hypervisor and/or the driver VM in FIG. 4 within other execution environments available to the computer system, such as other VMs, processes or other portions of the hypervisor. While the foregoing has described speculative notice techniques with an exemplary embodiment of a driver VM running on one CPU core or a multi-core processor communicating with a user VM running on another CPU core, it should be recognized that any processes that are running on different cores of a multi-core processor which need to communicate with each other may utilize the speculative notice techniques herein. For example, a device driver running within the hypervisor on a first CPU core may utilize the speculative notice techniques herein to wake up a VM running on a second CPU core. Similarly, other applications and processes that run on different CPU cores can also benefit from the speculative notice techniques disclosed herein when communicating with one another. It should further be recognized that a pass-through device, such as emulated NIC 126$_1$ of FIG. 2, is only one of a variety of methodologies to implement pass-through communication between a hardware device and a device driver in a guest operating system of a VM. For example, in one alternative embodiment implementing pass-through, the VMM of a VM is aware of I/O ports and device memory and is capable of receiving interrupts, but is not necessarily aware of which devices are pass-through devices and which I/O ports and interrupts are associated with each device. In such an alternative embodiment, the VMM may pass-through information corresponding to a hardware device to a driver VM but is not aware for which device it has passed through information. Additionally, while the foregoing description applies the use of a correlation matrix for one particular event (e.g., receipt of an interrupt from a hardware device), it should be recognized that correlation matrices may be used to maintain correlation of several events in sequence or in parallel. If these events occur on different CPUs, the notification techniques described here can apply in any such context. Furthermore, while the foregoing description has used a multi-core computer system as an example environment in which the techniques disclosed herein may be utilized, it should be recognized that any multiple processor computer system may utilize the techniques herein, including computer systems with a flat space of CPUs, asymmetric processors, special purposes processors and the like.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method performed in a first process associated with a hypervisor running on a first CPU of a multiprocessor computer system for speculatively waking a second process associated with a user virtual machine to run on a second CPU of the multiprocessor computer system, the method comprising the steps of:
    receiving a notification from an I/O device indicating availability of data from the I/O device, the notification having an associated vector;
    identifying that the second process correlates to the vector by checking a data structure that maintains correlations between vectors for received interrupts and a plurality of processes supported by the multiprocessor computer system that includes the second process;
    receiving an inter-virtual machine notification request from a third process associated with a driver virtual machine to wake up the user virtual machine after the driver virtual machine copies the data into a shared memory;
    incrementing an entry in the data structure corresponding to the user virtual machine and an interrupt vector for the interrupt;
    transmitting a wake-up message to the second process to wake up the second process to poll the shared memory for the data made available by the third process; and
    forwarding the notification to the third process comprising a handler running on the first CPU, wherein the handler is configured to handle the notification for the second process running on the second CPU, and wherein the handler is a device driver corresponding to the I/O device.

2. The method of claim 1, wherein the device driver resides in the driver virtual machine and the data is copied into the shared memory by a proxy process that interacts with the device driver, the proxy process being a guest application that runs in the driver virtual machine.

3. The method of claim 2, wherein the existing processes supported by the multiprocessor computer system relate to different user virtual machines.

4. The method of claim 2, further comprising the step of inserting a delay prior to the transmitting step.

5. The method of claim 2, further comprising the step of receiving a message from the user virtual machine indicating an excessive period of polling prior to receiving the data in the shared memory.

6. The method of claim 2, further comprising the steps of:
    receiving a message from the user virtual machine indicating that the user virtual machine timed out prior to receiving the data in the shared memory; and
    clearing entries in the data structure corresponding to the interrupt vector for the interrupt.

7. A non-transitory computer-readable storage medium including instructions that, when executed by a first CPU of a multiprocessor computer system, causes a first process associated with a hypervisor running on the first CPU to speculatively wake a second process associated with a user virtual machine to run on a second CPU of the multiprocessor computer system by performing the steps of:
    receiving a notification from an I/O device indicating availability of data from the I/O device, the notification having an associated vector;
    identifying that the second process correlates to the vector by checking a data structure that maintains correlations between vectors for received interrupts and existing processes supported by the multiprocessor computer system that includes the second process;

receiving an inter-virtual machine notification request from a third process associated with a driver virtual machine to wake up the user virtual machine after the driver virtual machine copies the data into a shared memory;

incrementing an entry in the data structure corresponding to the user virtual machine and an interrupt vector for the interrupt;

transmitting a wake-up message to the second process to wake up the second process to run on the second CPU and poll the shared memory for the data made available by the third process; and forwarding the notification to be handled by the third process comprising a handler running on the first CPU, wherein the handler is configured to handle the notification for the second process running on the second CPU, and wherein the handler is a device driver corresponding to the I/O device.

8. The non-transitory computer readable storage medium of claim 7, wherein the device driver resides in the driver virtual machine and the data is copied into the shared memory by a proxy process in the driver virtual machine that interacts with the device driver, the proxy process being a guest application that runs in the driver virtual machine.

9. The non-transitory computer readable storage medium of claim 8, wherein the existing processes supported by the multiprocessor computer system relate to different user virtual machines.

10. The non-transitory computer readable storage medium of claim 8, wherein the first CPU further performs the step of inserting a delay prior to the transmitting step.

11. The non-transitory computer readable storage medium of claim 8, wherein the first CPU further performs the step of receiving a message from the user virtual machine indicating an excessive period of polling prior to receiving the data in the shared memory.

12. The non-transitory computer readable storage medium of claim 8, wherein the first CPU further performs the steps of:

receiving a message from the user virtual machine indicating that the user virtual machine timed out prior to receiving the data in the shared memory; and clearing entries in the data structure corresponding to the interrupt vector for the interrupt.

13. A computer system configured to speculatively wake a user virtual machine waiting to receive data from an I/O device, the computer system comprising:

a multiprocessor comprising a first CPU and a second CPU;

a system memory comprising a shared memory accessible by a driver virtual machine configured to run on the first CPU and virtual devices of a user virtual machine configured to run on the second CPU; and a hypervisor configured to run on the first CPU to perform the steps of:

receiving a notification from the I/O device indicating availability of data from the I/O device, the notification having an associated vector;

identifying that the user virtual machine correlates to the notification by checking a data structure that maintains correlations between vectors for received interrupts and virtual machines running on the computer system;

receiving an inter-virtual machine notification request from the driver virtual machine to wake up the user virtual machine after the driver virtual machine copies the data into the shared memory;

incrementing an entry in the data structure corresponding to the user virtual machine and an interrupt vector for the interrupt;

transmitting a wake-up message to the user virtual machine to wake up the user virtual machine to poll the shared memory for the data coming from the driver virtual machine; and forwarding the notification to a handler running on the driver virtual machine, wherein the handler is a device driver corresponding to the I/O device.

* * * * *